United States Patent
Tatebayashi

(10) Patent No.: US 8,232,776 B2
(45) Date of Patent: Jul. 31, 2012

(54) CHARGING METHOD FOR AN ASSEMBLED CELL AND AN ASSEMBLED CELL SYSTEM

(75) Inventor: Yoshinao Tatebayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 134 days.

(21) Appl. No.: 12/887,543

(22) Filed: Sep. 22, 2010

(65) Prior Publication Data

US 2011/0006733 A1 Jan. 13, 2011

Related U.S. Application Data

(63) Continuation of application No. PCT/JP2009/054111, filed on Feb. 26, 2009.

(30) Foreign Application Priority Data

Mar. 25, 2008 (JP) .................................. 2008-078732

(51) Int. Cl.
*H02J 7/04* (2006.01)
*G01N 27/416* (2006.01)

(52) U.S. Cl. ........ 320/162; 320/116; 320/160; 324/426; 324/434

(58) Field of Classification Search .................... 320/162
See application file for complete search history.

(56) References Cited

U.S. PATENT DOCUMENTS

| 5,367,244 A | 11/1994 | Rose et al. | |
|---|---|---|---|
| 2007/0103113 A1* | 5/2007 | Embrey et al. | 320/112 |
| 2008/0203971 A1* | 8/2008 | Sakurai et al. | 320/134 |

FOREIGN PATENT DOCUMENTS

| EP | 1 796 243 A2 | 6/2007 |
| EP | 1 841 003 A1 | 10/2007 |
| JP | 2005-151683 | 6/2005 |

\* cited by examiner

*Primary Examiner* — Edward Tso
*Assistant Examiner* — Johali Torres Ruiz
(74) *Attorney, Agent, or Firm* — Oblon, Spivak, McClelland, Maier & Neustadt, L.L.P.

(57) ABSTRACT

According to one embodiment, a charging method for an assembled cell including a plurality of secondary batteries connected in series is disclosed. The method can detect the cell voltages. The method can set a charging current setting value so as to lower the charging current setting value of the assembled cell, if at least one of the detected cell voltages reaches a predetermined charge termination upper limit voltage. The method can control the charging current of the assembled cell according to the charging current setting value. In addition, the method can stop the charge, when a lowest cell voltage is lower than a predetermined charge termination lower limit voltage at a time when at least one of the cell voltages detected reaches the charge termination upper limit voltage.

18 Claims, 5 Drawing Sheets

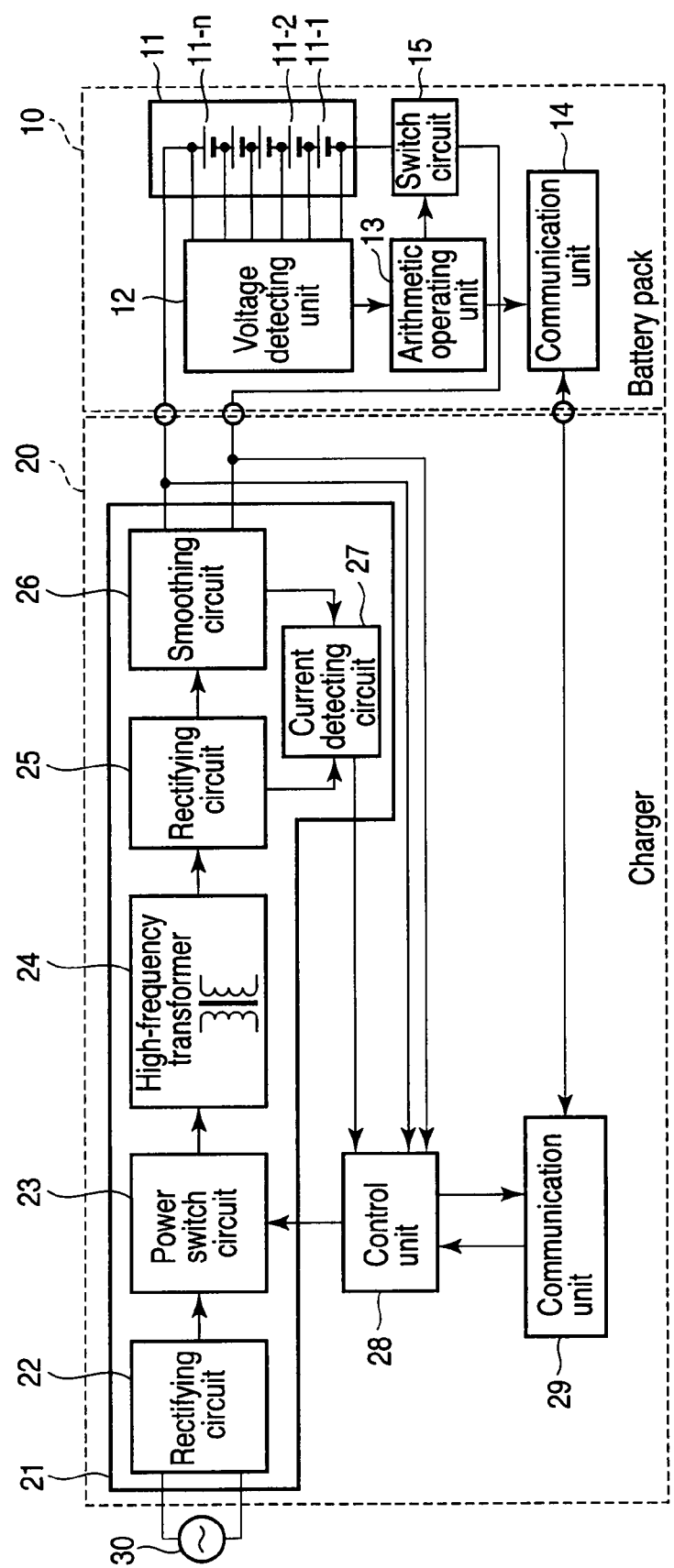
F I G. 1

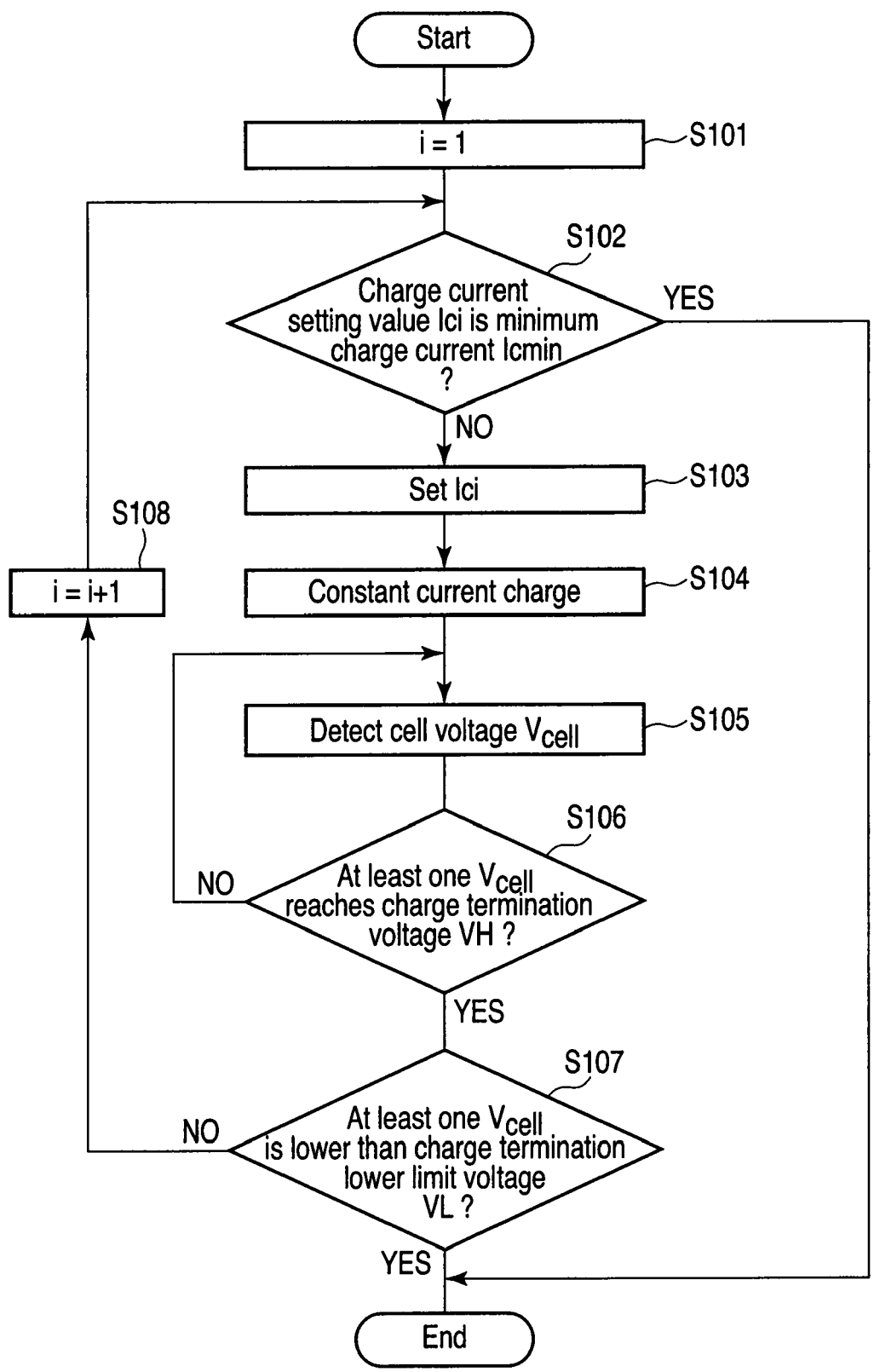
F I G. 3

CHARGING METHOD FOR AN ASSEMBLED CELL AND AN ASSEMBLED CELL SYSTEM

CROSS-REFERENCE TO RELATED APPLICATIONS

This is a Continuation Application of PCT Application No. PCT/JP2009/054111, filed Feb. 26, 2009, which was published under PCT Article 21(2) in English.

This application is based upon and claims the benefit of priority from Japanese Patent Application No. 2008-078732, filed Mar. 25, 2008; the entire contents of which are incorporated herein by reference.

FIELD

Embodiments described herein relate generally to a charging method for an assembled cell including a plurality of secondary batteries connected in series and an assembled cell system.

BACKGROUND

A high energy density secondary battery has been widely used as a power supply for small information equipment such as a portable phone and a notebook personal computer. The secondary batteries are often connected in series, the number of which corresponds to a voltage and current necessary for an objective apparatus or often used as an assembled cell in which they are connected in series or in parallel. Because a power supply voltage of the aforementioned small information equipment is about several V to 10V, the number of series connections in the assembled cell is 1 to 3.

On the other hand, in recent years, application of the secondary battery to purposes requiring a high power or high voltage such as household electric appliances, power tools, assisted bicycles and hybrid electric vehicles has been expanding rapidly as well as the power supply for the information equipment. Accompanied by this, the number of series connections in the assembled cell is increased, and it is not rare that 10 or more batteries are connected in series.

A prominent problem in connecting the batteries in series is a fluctuation between individual batteries (called cells). The fluctuation includes, for example, fluctuation in capacity, fluctuation in impedance, and fluctuation in the state of charge (SOC). A fluctuation which likely leads to an error of these ones is a fluctuation in voltage which is one of the fluctuations in the SOC.

If batteries having different capacities are connected in series or a plurality of batteries are connected under different SOCs, a cell having a higher voltage or a cell having a lower voltage than the average is generated in a fully charged state of the assembled cell. The cell having a higher voltage is turned into an overcharged state, whereby deterioration is intensified. If the charge is repeated, the cell whose deterioration is intensified by the overcharge has a reduced capacity, so that the overcharge is progressed, thereby accelerating the deterioration. As a result, the cycle service life of the assembled battery is shortened extremely than the service life of the cell.

Therefore, the assembled cell is demanded to control its cells not to be overcharged using a protective circuit. As well as the overcharging, all the cells of the assembled cell are preferred to be controlled not to be within abnormal ranges about other battery abnormalities such as over-discharging and overheating.

By the way, as a charge control method for use in nonaqueous electrolyte secondary battery, constant-current constant-voltage type is generally used. According to the constant-current constant-voltage type, the constant-current charge is carried out until the battery reaches a full-charge voltage, after which the constant-voltage charge is executed with the battery voltage maintained at a certain setting voltage. According to the constant-current constant-voltage type, when the cell is charged, the cell voltage never reaches an overcharge region. Even if a quick charge is carried out by increasing the charging current, a time required until the full-charge voltage is reached is shortened, but no higher voltage is reached.

On the other hand, if the assembled cell is charged according to the constant-current constant-voltage method, the fluctuation in voltage as described previously is produced. When a feedback control is carried out to a charging power supply, generally, the voltage of the assembled cell is controlled to be constant under the constant-voltage charge. Therefore, in any assembled cell in which cells having a low voltage and cells having a high voltage are connected in series, the cells having a high voltage reach the overcharge region.

Ideally, if the control for the constant-voltage charge can be carried out for all the cells of the assembled cell, the problem of overcharging due to fluctuation in voltage never occurs. However, to carry out the constant-voltage charge for the voltages of all the cells of the assembled cell, the following complicated processings need to be adopted into the feedback loop for controlling the charge power supply: (i) measuring the voltages of all the cells, (ii) selecting the highest cell voltage by comparing respective cell voltages, (iii) comparing the highest cell voltage with a reference voltage, and (iv) controlling the output voltage of the charge power supply based on the comparison result of (iii). Even if such a processing can be adopted into the feedback loop, the feedback loop has a number of unstable factors in terms of a response speed, stability and resistance to disturbance such as a noise. For this reason, a problem exists in reliability and as the number of cells connected in series in the assembled cell increases, the circuit configuration becomes complicated, which is disadvantageous in terms of cost and size.

In the assembled cell system for most applications, the assembled cell and the charger are provided separately and the assembled cell and the charger are connected only at the time of charging. However, complicated feedback information containing information about all the cell voltages cannot be transmitted between the assembled cell and the charger easily.

The fluctuation in voltage between the cells being recharged increases as the fluctuation in SOC increases between the cells or the voltage change rate of the cell voltage with respect to the SOC in the vicinity of the full charge increases or the charging current increases. Therefore, if it is attempted to charge rapidly the assembled cell composed of the cells having a characteristic which allows the cell voltage to rise steeply at an end period of recharging, particularly those problems become prominent. Because generally, the assembled cell has the problem about the fluctuation in voltage among the cells, a charge inhibit cell voltage is set on a higher voltage side than the full-charge voltage of the cell. However, if the fluctuation in voltage among the cells is increased, part of the cells surpass the charge inhibit cell voltage during recharging, so that sometimes, the charging is stopped halfway.

If the assembled cell is charged according to the constant-current constant-voltage type in order to avoid such a phenomenon, the setting voltage at the time of constant voltage charging is set lower than (full-charge voltage of a cell)× (number of the cells connected in series). Generally, if the charging voltage is decreased further, the charge is executed in a region in which the voltage change with respect to the SOC is smaller. Thus, even if the same amount of the fluctuation in SOC is present, the fluctuation in voltage is decreased. Further, generally the voltage which the cell reaches is decreased, so that the voltage margin required until the charge inhibit cell voltage is reached can be increased. Even if the fluctuation in voltage occurs, that fluctuation is produced around voltages lower than the full-charge voltage which can be recharged on the cell, thereby lowering a possibility that overcharging may occur. However, if the setting voltage at the time of the constant voltage is lowered, a problem that the charge capacity is limited and a problem that the charge speed is lowered due to the limited quick charge performance are produced.

Another charge method which does not limit the charge capacity or charge speed while avoiding overcharging due to the fluctuation in voltage has been disclosed in, for example, JP-A 2005-151683 (KOKAI). According to the charge method disclosed in JP-A 2005-151683 (KOKAI), the entire assembled cell is charged according to the constant-current method and when any one of the cells contained in the assembled cell reaches the full-charge voltage, the charging current is decreased and then the constant-current charge is continued. By repeating this step to decrease the charging current step by step, the cells are charged.

According to this charge method, even if the voltage of the cell is fluctuated, the charging current is lowered when the cell which indicates the highest voltage reaches the full-charge voltage. It never happens that all the cell voltages drop and reach the overcharge voltage at a moment when the charging current drops. Further, if the constant current charge is carried out with a sufficiently small current value finally, a charge capacity similar to a case of the constant-current constant-voltage charge method can be obtained. Further, by setting the reduction rate of the charging current of each step smaller, a charge speed similar to the case of the constant-current constant-voltage method can be obtained.

According to the method disclosed in JP-A 2005-151683 (KOKAI), even if the voltage of the cell is fluctuated, the charge is continued. For this reason, even if cells having a much lower voltage than the other cells are contained, the charge is never stopped due to, for example, internal short-circuiting. The same thing happens in the case where part of the assembled cell is heated locally so that the impedance of part of the cells drops and then, the voltage of the cells at the time of charge is lowered.

According to the constant-current constant-voltage method, if there exists a cell having a particularly low voltage in the assembled cell due to the internal short-circuiting or overheating, the voltages of the other cells are necessarily increased. As a result, the charge is stopped because of the overcharge inhibit condition. However, the method disclosed in JP-A 2005-151683 (KOKAI) embraces a new problem that such a safety mechanism may be inactivated so that a cell exhibiting an internal short-circuiting problem is recharged and used as it is and consequently, the locally heated cell may be heated further by Joule heat produced by the rapid charging.

BRIEF DESCRIPTION OF THE DRAWINGS

FIG. 1 is a block diagram showing an assembled cell system according to an embodiment.

FIG. 3 is a flowchart showing a flow of the charge control of the same embodiment.

DETAILED DESCRIPTION

Figure 2:
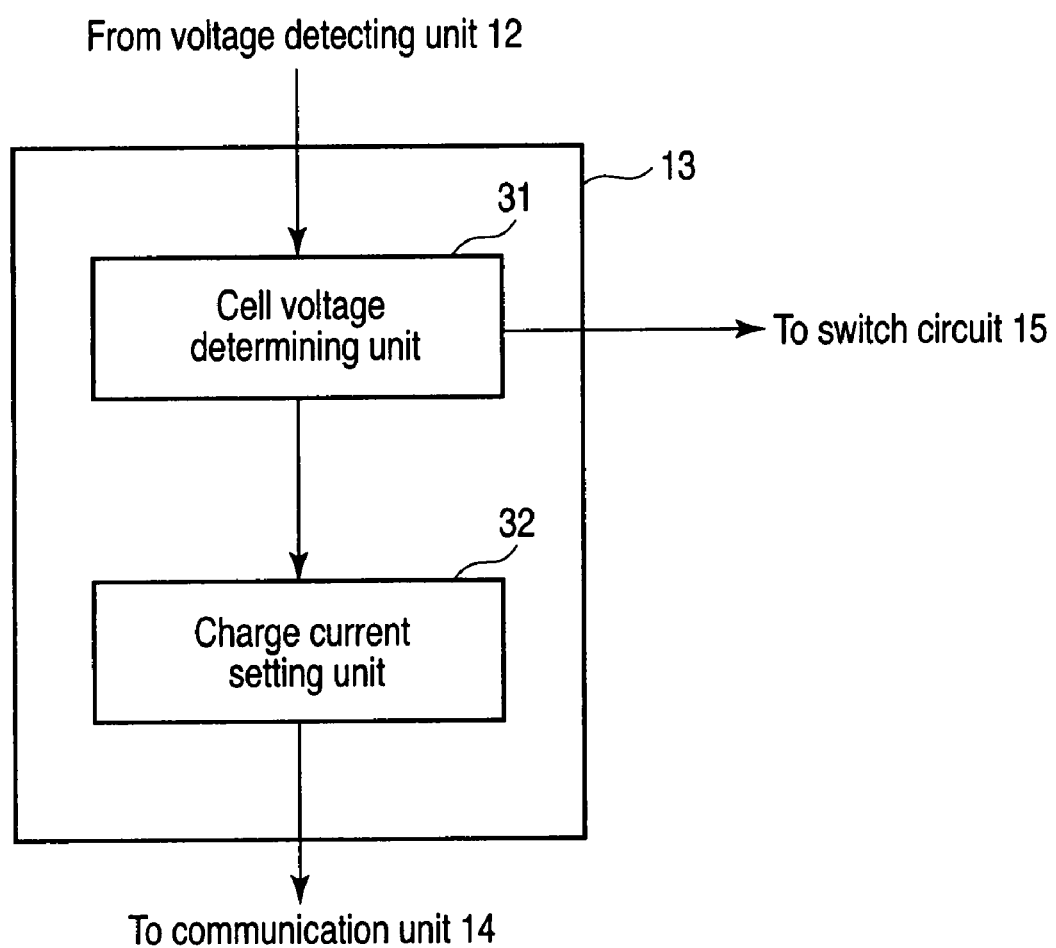
FIG. 2 is a block diagram showing the detail of an arithmetic operating section of the same embodiment.

In general, according to one embodiment, a charging method for an assembled cell including a plurality of secondary batteries connected in series is disclosed. The method can detect the cell voltages. The method can set a charging current setting value so as to lower the charging current setting value of the assembled cell, if at least one of the detected cell voltages reaches a predetermined charge termination upper limit voltage. The method can control the charging current of the assembled cell according to the charging current setting value. In addition, the method can stop the charge, when a lowest cell voltage is lower than a predetermined charge termination lower limit voltage at a time when at least one of the cell voltages detected reaches the charge termination upper limit voltage.

Hereinafter, an embodiment will be described in detail with reference to the accompanying drawings.

FIG. 1 shows an assembled cell system according to an embodiment. The assembled cell system has mainly a battery pack 10 and a charger 20. To charge the battery pack 10, the battery pack 10 and the charger 20 are connected as shown in the same Figure and to discharge the battery pack 10, both of them are disconnected and the battery pack 10 is connected to a load. Although FIG. 1 shows an example in which the battery pack 10 and the charger 20 are separated from each other, it is permissible to use an assembled cell in which both of them are combined as a power supply system.

The battery pack 10 is equipped with an assembled cell 11 having a plurality of cells 11-1 to 11-$n$ connected in series. Although the number of the serial connections of the assembled cell 11 is 5 in FIG. 1, n may be an arbitrary number of 2 or more. The section indicated with a single battery in FIG. 1 may be of plural batteries connected in parallel and in that case, a parallel serial assembled cell is used. The battery pack 10 further includes a voltage detecting unit 12, an arithmetic operating unit 13, a communication unit 14 and a switch circuit 15.

The voltage detecting unit 12 is connected to the connecting points of all the cells 11-1 to 11-$n$ of the assembled cell 11 in order to detect the voltage of the cells 11-1 to 11-$n$ (called cell voltage). If the assembled cell contains a parallel connection, the voltage detecting unit 12 only needs to detect the voltage at a single position for each group of the parallel connections because the same group of the parallel connection has an identical voltage. A detection result of the voltage detecting unit 12 is input to the arithmetic operating unit 13.

The arithmetic operating unit 13 determines all cell voltages detected by the voltage detecting unit 12 and determines a charging current setting value Ic based on that determine result. If the cell voltage detected by the voltage detecting unit 12 is abnormal, the arithmetic operating unit 13 turns off the switch circuit 15 inserted in between the assembled cell 11 and the charger 20 so as to shut down a charging current or discharging current forcibly.

The arithmetic operating unit 13 has a cell voltage determining unit 31 and a charging current setting unit 32 as shown in an example of the internal configuration of FIG. 2. The cell voltage determining unit 31 determines a cell voltage detected by the voltage detecting unit 12 using the charge termination upper limit voltage and charge termination lower limit voltage determined preliminarily so as to obtain a determine result. More specifically, the cell voltage determining unit 31 determines (a) whether or not each cell voltage reaches its charge termination upper limit voltage during a charging of the assembled cell 11 and further, (b) whether or not the lowest cell voltage at a time when at least one of the cell voltages reaches the charge termination upper limit voltage is lower than the charge termination lower limit voltage. The arithmetic operating unit 13 is constituted of, for example, a micro controller incorporating an analog-to-digital converter (ADC) and makes the above-described judgment after converting the cell voltage detected by the voltage detecting unit 12 to a digital signal.

If at least a cell voltage reaches the charge termination upper limit voltage, the charging current setting unit 32 sets up a charging current setting value so as to lower the charging current of the assembled cell 11, based on the determine result (a) of the cell voltage determining unit 31. Information of the charging current setting value set in this way is transmitted to the charger 20 through the communication unit 14.

Information about the determine result (b) of the cell voltage determining unit 31 is transmitted to the switch circuit 15. If the lowest cell voltage at a time when at least one of the cell voltages reaches the charge termination upper limit voltage is lower than the charge termination lower limit voltage when the assembled cell is being charged, the switch circuit 15 is turned off so as to stop the charge.

On the other hand, the charger 20 is equipped with a charge power supply 21, a control unit 28 and a communication unit 29. The charge power supply 21 includes a primary rectifying circuit 22, a power switch circuit 23, a high-frequency transformer circuit 24, a secondary rectifying circuit 25, a smoothing circuit 26 and a current detecting circuit 27 and produces a charging current under the control of the control unit 28. The communication unit 29 receives information on the charging current setting values transmitted from the battery pack 10 through the communication unit 14 and transmits it to the control unit 28.

Not only do the communication units 14 and 29 exchange information about the charging current setting value but also necessary other information is exchanged between the battery pack 10 and the charger 20. Description of the latter is omitted. The communication method of the communication units 14 and 29 may be serial communication or parallel communication of digital data or may be communication using analog value as it is.

In the case of an assembled cell system in which the battery pack and charger are integrated, the communication units 14 and 29 are not always necessary but if the battery pack 10 and the charger 20 are separated from each other as shown in FIG. 1, it is preferable to provide the communication units 14 and 29.

The switch circuit 15 is not always necessary and information about the determine result (b) of the cell voltage determining unit 31 is transmitted to the charging current setting unit 32 and further may be transmitted through the communication unit 14 to stop the charge output of the charger 20.

To describe the charge power supply 21 briefly, in the primary rectifying circuit 22, the voltage of an external AC power supply (for example, commercial AC power supply) is rectified and a DC voltage obtained thereby is switched by high frequency in the power switch circuit 23. The high-frequency voltage produced by the power switch circuit 23 is transmitted to the secondary rectifying circuit 25 through the high-frequency transformer circuit 24 and rectified there. An output from the secondary rectifying circuit 25 is smoothed by the smoothing circuit 26. The current detecting circuit 27 detects a charging current produced by the secondary rectifying circuit 25 and the smoothing circuit 26.

The control unit 28 controls the power switch circuit 24 according to, for example, pulse width modulation (PWM) system so that the charging current detected by the current detecting circuit 27 coincides with a charging current setting value transmitted from the battery pack 10. Further, the control unit 28 has a function of feedback controlling the charging current based on the output voltage (charging voltage) of the charge power supply 21 as required.

Next, a detailed flow of the charge control in the assembled cell system of this embodiment will be described using the flowchart shown in FIG. 3.

A charge termination upper limit voltage VH and a charge termination lower limit voltage VL of the cells 11-1 to 11-n which constitute the assembled cell 11 are set in the cell voltage determining unit 31. The charge termination upper limit voltage VH is a preferable upper limit cell voltage at the time of stopping the charge and called just charge termination voltage. The charge termination lower limit voltage VL is a lower limit cell voltage at the time of stopping the charge.

Assuming that the charging current setting value is Ici and, the larger i, the smaller the charging current setting value, the charging current setting unit 32 of the arithmetic operating unit 13 sets up i=1 (step S101) and after step S102 described later is passed, sets Ici to Ic1 (step S103). Information of the charging current setting value Ic1 set in this way is transmitted to the charger 20 from the battery pack 10 so as to start the constant current charge to the assembled cell 11 (step S104).

The voltage detecting unit 12 detects a cell voltage Vcell in a short cycle of, for example, several msec to several seconds (step S105) and data of the detected cell voltage Vcell is input to the arithmetic operating unit 13. The arithmetic operating unit 13 determines each cell voltage detected by the cell voltage determining unit 31 by comparing it with the charge termination upper limit voltage VH (step S106).

If it is determined that at least one cell voltage of the respective cell voltages reaches the charge termination upper limit voltage VH in step S106, the charging current setting unit 32 increments i by 1 (step S108) and sets a charging current setting value Ic2 smaller by 1 step than Ic1. Information on the charging current setting value Ic2 set in this manner is transmitted from the battery pack 10 to the charger 20, thereby continuing the constant current charge (step S104).

If the charging current setting value Ici drops in this way and it is determined that the charging current setting value Ici has reached a minimum charging current Icmin in this process in step S102, the charge of the assembled cell 11 is terminated. The termination of the charge may be determined not only by the Ici but also according to other standard (or condition) such as when the total charging time exceeds a predetermined time. The predetermined value of the Ici may be stored as a table by the arithmetic operating unit 13 or a different value may be set up each time depending on a detected cell voltage Vcell.

If at least one cell voltage Vcell reaches the charge termination upper limit voltage VH in step S106, whether or not at least one of other cell voltages at that time (when at least one cell voltage Vcell reaches VH) reaches the charge termination lower limit voltage VL is checked (step S107). If a result of step S107 is YES, the switch circuit 15 is turned off to terminate the charge without proceeding to the constant-current charge using a next charging current setting value by incrementing i.

After i is incremented by 1 in step 108, the charging current setting unit 32 sets up a charging current setting value Ici smaller by a step than a previous charging current setting value (Ici−1) in step S103. At this time, the charging current setting value Ici may be decreased as the difference between the cell voltages (fluctuation in voltage) at a time when the cell voltage reaches the charge termination upper limit voltage VH is increased.

According to this embodiment, addition of the processing of step S107 is a prominent point. By adding the processing of step S107, a high safety against a large fluctuation in cell voltage due to an abnormality of the battery such as internal short-circuiting can be secured.

Figure 4:
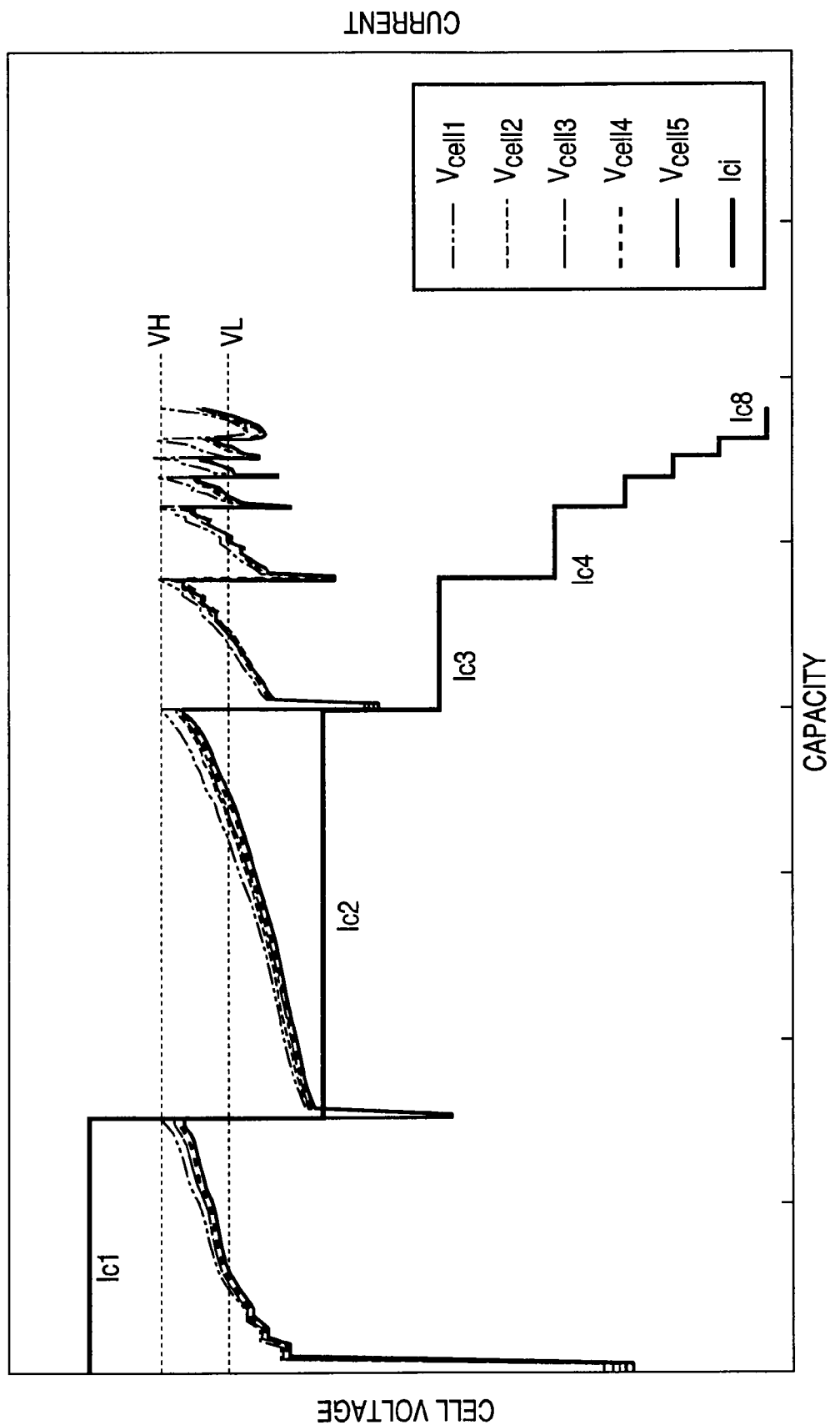
FIG. 4 is a diagram showing a charge curve when the charge is continued with the charge-current setting value for the constant-current charge decreased step by step, according to the same embodiment.
Figure 5:
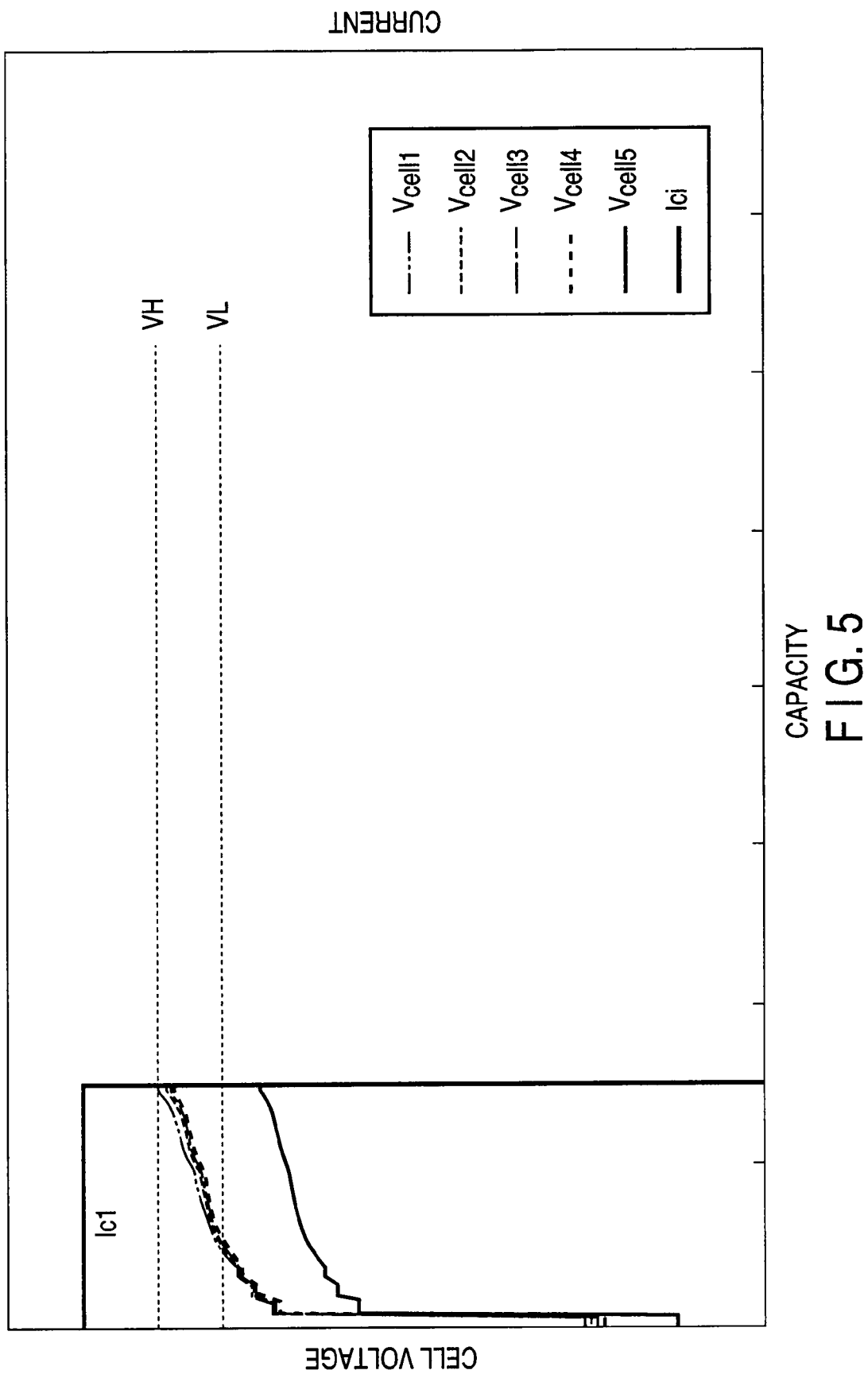
FIG. 5 is a diagram showing a charge curve of a case where a battery having a lower cell voltage than a charge termination lower limit exists when the cell voltage reaches a charge termination upper limit according to the same embodiment.

FIGS. 4 and 5 show a charge curve of the assembled cell of this embodiment, while its abscissa indicates the capacity and the ordinate indicates the cell voltage and charging current. FIG. 4 expresses a state of continuing the charge while reducing the charging current setting value Ici of the constant current charge by step like Ic1→Ic2→Ic3→Ic4→Ic5→Ic6→Ic7→Ic8. That is, if the cell voltage Vcell reaches the charge termination upper limit voltage VH when the constant current charge is being carried out under each charging current setting value Ici, the charging current setting value is lowered by a step and then the constant current charge is executed. Then, this processing is repeated.

FIG. 4 shows an example of the case where all the cell voltages exceed the charge termination lower limit voltage VL when a certain cell voltage reaches VH at all the charging current setting values Ic1 to Ic8. On the other hand, FIG. 5 shows an example in which an individual battery having a cell voltage lower than the VL (for example, Vcell5) exists when a certain cell voltage (for example, cell voltage Vcell1) reaches VH. The phenomenon of FIG. 5 occurs when there exists a large fluctuation in cell voltage due to an abnormality of the battery such as the internal short-circuiting.

According to this embodiment, if a cell voltage lower than the VL exists when a certain cell voltage reaches VH, the result of step S107 of FIG. 3 turns to YES and at that point, the charge is stopped. Thus, it never happens that an individual battery exhibiting internal short-circuiting is recharged or a locally overheated battery is heated more by the Joule heat by the quick charge, thereby ensuring a high safety.

To detect an existence of any abnormal battery in which internal short-circuiting is produced by a fluctuation in voltage caused by the fluctuation in SOC, it is permissible to monitor the fluctuation in the voltage of the cell simply and when a difference between a maximum value and a minimum value exceeds a specified value, determine that an abnormality exists. However, generally an assembled cell composed of nonaqueous electrolyte secondary battery is preferred to be in a condition that the SOC is satisfied 100% on the full-charge side in terms of preventing overcharging of each cell. If such an assembled cell is constructed, it is preferable to determine the fluctuation in SOC on the charge side, not on the discharge side. The fluctuation in SOC depending on a fluctuation in voltage can be detected at a higher sensitivity and accuracy as the voltage change rate with respect to the battery capacity is intensified. For example, if the voltage measuring accuracy is ±10 mV and the voltage change rate with respect to the battery capacity is 20 (mV/% SOC), 1% fluctuation in SOC can be detected. Generally, in the nonaqueous electrolyte secondary battery, the voltage change rate is the largest near 0% and near 100% in SOC. Therefore, as in this embodiment, it is most preferable to determine whether or not there exists any cell whose SOC is fluctuated largely due to the internal short-circuiting, depending on whether or not there exits any cell having a voltage lower than the charge termination lower limit voltage when at least one of the cells reaches the charge termination upper limit voltage during charging.

In this embodiment, preferably, the charging current setting unit 32 is so constructed that the maximum charging current setting value of the assembled cell 11 is set higher than 10C. (1C is equivalent to the current to discharge a battery from 100% SOC to 0% SOC in an hour.) As the initial charging current setting value Ic1 is increased, the SOC at a time when the cell voltage initially reaches VH is decreased. Conversely, as the Ic1 is decreased, the SOC at a time when the cell voltage initially reaches VH is intensified, turning to a state near the full charge. In this embodiment, for the charge to be terminated when there occurs a fluctuation in cell voltage due to an abnormality of the battery such as the internal short-circuiting, it is necessary for at least one cell voltage to reach VH to produce the aforementioned step S107. Therefore, if there exists an abnormal battery, as the Ic1 is decreased, the charge is terminated in a state nearer the full charge. If the Ic1 is 10 C or more, the charge can be terminated before the SOC comes near 100%, which is preferable.

Further, in the individual batteries 11-1 to 11-$n$ of this embodiment, if the constant current charge of 1 C current is executed under an environment of 25° C., it is preferable that a voltage change rate A1 (V/% SOC) (SOC is a charge capacity ratio with respect to the full-charge capacity of the individual battery) with respect to a battery capacity when the charge termination upper limit voltage VH is reached is larger than 20 (mV/% SOC).

As described previously, the voltage change rate A1 with respect to the battery capacity when the charge termination upper limit voltage VH is reached corresponds to the sensitivity upon detecting the fluctuation in SOC by the fluctuation in voltage and the change rate of A1=20 (mV/% SOC) corresponds to a difference in voltage of 200 mV when the SOC is fluctuated by 10%. In an actual assembled cell, even if A1=20 (mV/% SOC), the battery whose SOC is fluctuated to a low level does not reach the charge termination upper limit voltage VH. As a result, a difference in voltage between the VH and the lowest battery voltage is smaller than 200 mV. However, if A1>20 (mV/% SOC), a small fluctuation in SOC due to minute internal short-circuiting can be detected securely, which is preferable.

Hereinafter, specific examples of the embodiment will be described. However, the embodiment is not restricted to the following examples.

Example 1

Conducting material and binder were mixed up using lithium cobalt oxide (LiCoO$_2$) as a positive electrode active material, after which this mixture was dispersed in n-methylpyrrolidone (NMP) to prepare positive electrode slurry. This positive electrode slurry was applied to an aluminum foil having a thickness of 15 μm (purity: 99.99 wt. %), dried and pressed to produce a positive electrode.

On the other hand, conducting material and binder were mixed up using lithium titanate (Li$_4$Ti$_5$O$_{12}$) as a negative electrode active material, after which this mixture was dispersed in n-methylpyrrolidone (NMP) to prepare negative electrode slurry. This negative electrode slurry was applied to an aluminum foil having a thickness of 15 μm (purity: 99.99 wt. %), dried and pressed to produce a negative electrode.

Next, by repeating the procedure of (i) disposing a separator made of a belt-like polyethylene porous film having a thickness of 20 μm laterally, (ii) placing a strip-like cut positive electrode piece on the left end of the separator, (iii) folding back the separator to the left along the right end of the positive electrode piece, (iv) placing a strip-like cut negative electrode piece on the separator and (v) folding back the separator to the right along the left end of the negative electrode piece, 31 positive electrodes and 30 negative electrodes were stacked across the separators so as to produce a power generating element.

After the produced power generating element was pressed into a defined shape, the positive electrode terminal and positive electrode piecies, the negative electrode terminal and negative electrode piecies were connected respectively. The power generating element was sealed into a laminated sheath and nonaqueous electrolyte was poured therein so as to produce a flat nonaqueous electrolyte secondary battery (individual battery) having a capacity of 3 Ah. The charge termination upper limit voltage VH1 was 2.8V and the voltage change rate A1 (V/% SOC) with respect to the battery capacity when the full charge is reached (SOC is a charge capacity ratio with respect to the full-charge capacity of the battery) was 150 (mV/% SOC).

Five individual batteries were prepared and each battery was charged according to the constant-current constant-voltage charge method of 1 C2.8V until the charging current reached 0.05 C. After that, the five individual batteries were connected in series and a voltage measuring terminal was taken out from the connecting unit of each battery so as to produce an assembled cell and an assembled cell system as shown in FIG. 1. The SOC of each battery turned into the initial state in which it was satisfied 100% when the assembled cell was fully charged. The charging current setting values Ic1, Ic2, . . . Ic12 were set to 12C, 11C, . . . 1C and the minimum charging current was set to Icmin=1C and the charge termination lower limit voltage was set to VL=2.45V.

Example 2

As in Example 1, a cell was produced and then, the assembled cell and assembled cell system as shown in FIG. 1 were produced. The charging current setting values Ic1, Ic2, . . . Ic6 were set to 12C, 10C, . . . 2C and the minimum charging current was set to Icmin=2C and the charge termination lower limit voltage was set to VL=2.45V.

Example 3

As in Example 1, a cell was produced and the assembled cell and assembled cell system as shown in FIG. 1 were produced. An initial charging current setting value Ic1 was set to 12 C, second and following charging current setting values were set to Ici, Ici=Ici−1×Vmin/VH×0.95, the minimum charging current was set to Icmin=1C and the charge termination lower limit voltage was set to VL=2.45V. The Vmin is assumed to be a lowest cell voltage when at least a cell voltage reaches VH. According to Example 3, as described above, when a charging current setting value Ici smaller than the previous charging current setting value (Ici−1) by a step is set up, the charging current setting value Ici is decreased as a difference between the cell voltages at the time when the cell voltage reaches the charge termination upper limit voltage VH is increased.

Comparative Example 1

As in Example 1, a cell was produced and the same assembled cell and assembled cell system as shown in FIG. 1 were produced. Although Ic1, Ic2, . . . Ic12 were set to 12C, 11C, . . . 1C and the minimum charging current was set to Icmin=1C, no charge termination lower limit voltage VL was set up in the arithmetic operating unit 13.

Comparative Example 2

As in Example 1, a cell was produced and the same assembled cell and assembled cell system as shown in FIG. 1 were produced. The constant-current constant-voltage charge of 12C, 14V was performed in the charger 20 and the charge was terminated at a moment when the charging current was reduced to 1 C. If the cell voltage exceeds an overcharge region of 2.9V, the charging was inhibited.

Comparative Example 3

As in Example 2, a cell was produced and the same assembled cell and assembled cell system as shown in FIG. 1 were produced. The constant-current constant-voltage of 12C, 13V was performed in the charger 20 and the charge was terminated at a moment when the charging current was reduced to 1 C. If the cell voltage exceeds an overcharge region of 2.9V, the charging was inhibited.

About the assembled cell systems of Examples 1 to 3 and Comparative Examples 1 to 3, the quick charge test described in (1) to (5) below was performed to measure a charge capacity, a charge time up to 80% SOC with respect to the full-charge capacity and a highest temperature of the cell surface for comparison thereof. Prior to the quick charge test, each cell was charged according to the constant-current constant-voltage charge method of 1 C, 2.8V always under 25° C. until the charging current reached 0.05 C so as to achieve SOC100%. By a method in which the constant-current discharge was performed with 10C and the discharge was terminated when the lowest value of the cell voltage reached 1.8V, the entire assembled cell system was turned into discharge state.

1) Charging was performed according to the previously described set charge method under an environmental temperature of 25° C. for each example and Comparative Example.

2) After only second and third cells (11-2, 11-3) were discharged by only 20 mAh using a constant current of 0.2 C under an environmental temperature of 25° C., they were recharged according to the above-described set charging method for each example and Comparative Example.

3) After only second and third cells (11-2, 11-3) were discharged by only 100 mAh using a constant current of 0.2 C under an environmental temperature of 25° C., they were recharged according to the above described set charging method for each example and Comparative Example.

4) After only second and third cells (11-2, 11-3) were discharged by only 300 mAh using a constant current of 0.2 C under an environmental temperature of 25° C., they were recharged according to the above described set charging method for each example and Comparative Example.

5) After a resistor of 2Ω was connected in close contact with and in parallel to a third cell (11-3) under an environmental temperature of 25° C., it was recharged according to the above-described set charging method for each example and Comparative Example. This aims at simulating a situation in which the third cell 11-3 is suddenly short-circuited internally so that current flows while heat is produced.

Table 1 shows a charge capacity, highest surface temperature of the cells and charging time up to SOC80% based on full-charge capacity under each of the above-mentioned (1) to (5) are regarded as standard.

TABLE 1

|  |  | Example 1 | Example 2 | Example 3 | Comparative Example 1 | Comparative Example 2 | Comparative Example 3 |
|---|---|---|---|---|---|---|---|
| Condition (1) | Charge capacity (Ah) | 3 | 2.9 | 3 | 3 | 3 | 2.85 |
|  | 80% charging time (sec) | 275 | 285 | 270 | 275 | 260 | 360 |
|  | Cell maximum temperature (° C.) | 35 | 34 | 35 | 35 | 36 | 33 |
| Condition (2) | Charge capacity (Ah) | 3 | 2.9 | 3 | 3 | 2.95 | 2.85 |
|  | 80% charging time (sec) | 275 | 285 | 270 | 275 | 260 | 360 |
|  | Cell maximum temperature (° C.) | 35 | 34 | 35 | 35 | 36 | 33 |
| Condition (3) | Charge capacity (Ah) | 3 | 2.9 | 3 | 3 | 2.8 | 2.85 |
|  | 80% charging time (sec) | 275 | 285 | 270 | 275 | 260 | 360 |
|  | Cell maximum temperature (° C.) | 35 | 34 | 35 | 35 | 36 | 33 |
| Condition (4) | Charge capacity (Ah) | 1.8 | 2.1 | 1.7 | 3 | 2.5 | 2.8 |
|  | 80% charging time (sec) | — | — | — | 275 | 258 | 355 |
|  | Cell maximum temperature (° C.) | 35 | 34 | 35 | 35 | 36 | 33 |
| Condition (5) | Charge capacity (Ah) | 1.9 | 2.2 | 1.7 | 3 | 2.4 | 2.6 |
|  | 80% charging time (sec) | — | — | — | 275 | 258 | 351 |
|  | Cell maximum temperature (° C.) | 40 | 43 | 38 | 62 | 45 | 48 |

In a state having little fluctuation among cells as shown in the condition (1), normal quick charge was possible in each Example and Comparative Example. However, because in Comparative Example 3, the constant voltage at the time of charging was low and current converged more quickly than other examples, a longer 80% charging time was necessary.

In a state having a little fluctuation among cells as shown in the condition (2), substantially the same normal quick charge as the condition (1) was possible except in Comparative Example 2. In Comparative Example 2, the fluctuation in cell voltage was expanded at an end period of the charge, so that some cell reached 2.9V and the charge was not continued until the charging current was dropped to 1 C.

In a state in which the fluctuation among cells was expanded further as shown in the condition (3), there was no change in charge capacity and speed in Examples 1 to 3 and Comparative Example 1 which handle the constant current and decrease the current step by step. On the other hand, in Comparative Example 2, the charge was not continued up to an end, and as a result, substantially the same effect as the condition (2) was obtained in Comparative Example 3.

Under a condition having a very large fluctuation among cells (10% with respect to SOC) as shown in the condition (4), an actual assembled cell system can cope with a situation having a possibility of any cell abnormality. In Examples 1 to 3, the charge could be stopped halfway because there existed a cell which indicated a voltage lower than the charge termination lower limit voltage VL. On the other hand, in Comparative Examples 2 and 3, the overcharge termination upper limit voltage 2.9V was reached at an earlier stage than the condition (3) and the charge was terminated. In Comparative Example 1, the charge was continued as in the conditions (1) to (3).

In Examples 1 to 3, there existed a cell which indicated a voltage lower than the charge termination lower limit voltage VL even under a condition having a large fluctuation among cells and a large heat generation as shown in the condition (5). As a result, the charge could be stopped at a stage having a small temperature rise. On the other hand, in Comparative Examples 2 and 3, the overcharge termination upper limit voltage of 2.9V was reached at an early stage than the condition (4) and then, the charge was terminated. Comparative Example 1 indicated the highest temperature because the charge was continued like the conditions (1) to (4).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charging method for an assembled cell including a plurality of secondary batteries connected in series, comprising:
    detecting the cell voltages;
    setting a charging current setting value so as to lower the charging current setting value of the assembled cell, if at least one of the detected cell voltages reaches a predetermined charge termination upper limit voltage;
    controlling the charging current of the assembled cell according to the charging current setting value; and
    stopping the charge, when a lowest cell voltage is lower than a predetermined charge termination lower limit voltage at a time when at least one of the cell voltages detected reaches the charge termination upper limit voltage.

2. The method according to claim 1, further comprising determining the detected cell voltages using the charge termination upper limit voltage and the charge termination lower limit voltage.

3. The method according to claim 1, wherein setting of the charging current setting value is repeating a processing of lowering the charging current setting value until the charging current setting value reaches a predetermined minimum charging current.

4. The method according to claim 1, wherein setting of the charging current setting value is repeating a processing of lowering the charging current setting value until the charging time of the assembled cell reaches a predetermined time.

5. The method according to claim 1, wherein in the setting of the charging current setting value, the charging current setting value is decreased as a difference between the cell voltages at a time when at least one of the detected cell voltages reaches the charge termination upper limit voltage is increased.

6. An assembled cell system comprising:
    an assembled cell configured to include a plurality of cells connected in series;

a voltage detecting unit configured to detect a voltage of the cell;

a setting unit configured to set a charging current setting value so as to lower the charging current setting value of the assembled cell, when at least one of the detected cell voltages reaches a predetermined charge termination upper limit voltage; and a switch unit configured to stop the charge, when the lowest cell voltage is lower than a predetermined charge termination lower limit voltage at a time when at least one of the cell voltages reaches the charge termination upper limit voltage.

7. The system according to claim 6, further comprises a determining unit configured to determine the detected cell voltage using the charge termination upper limit voltage and the charge termination lower limit voltage.

8. The system according to claim 6, further comprises a control unit configured to control the charging current of the assembled cell based on the charging current setting value.

9. The system according to claim 6, wherein the setting unit is repeating a processing of lowering the charging current setting value until the charging current setting value reaches a predetermined minimum charging current.

10. The system according to claim 6, wherein setting unit is repeating a processing of lowering the charging current setting value until the charging time of the assembled cell reaches a predetermined time.

11. The system according to claim 6, wherein the setting unit is configured to decrease the charging current setting value as a difference between the cell voltages at a time when at least one detected cell voltage reaches the charge termination upper limit voltage is increased.

12. The system according to claim 6, wherein the setting unit is configured to set the maximum charging current setting value of the assembled cell to 10 C or higher.

13. The system according to claim 6, wherein, when a constant current charge of 1 C is carried out under an environment of 25° C., the cell is so configured that a voltage change rate $A_1$ (V/% SOC) (SOC is a charge capacity ratio with respect to the full-charge capacity of the cell) with respect to the battery capacity at a time when the charge termination upper limit voltage is reached is larger than 20 (mV/% SOC).

14. The system according to claim 6, wherein the cell has a negative electrode containing lithium titanate.

15. The system according to claim 6, further comprising:
a battery pack configured to incorporate the assembled cell, the voltage detecting unit and the setting unit; and
a charger configured to include a charge power supply to charge the assembled cell and controlled by the control unit.

16. The system according to claim 15, wherein the battery pack further incorporates a determining unit configured to determine the detected cell voltage using the charge termination upper limit voltage and the charge termination lower limit voltage.

17. The system according to claim 15, wherein the charger further includes a control unit configured to control the charging current of the assembled cell based on the charging current setting value.

18. The system according to claim 15, further comprising a communication unit configured to transmit information indicating the charging current setting value to the control unit.

* * * * *